A. J. BROWN.
FIELD MAGNET STRUCTURE.
APPLICATION FILED APR. 19, 1909.
992,846.
Patented May 23, 1911.
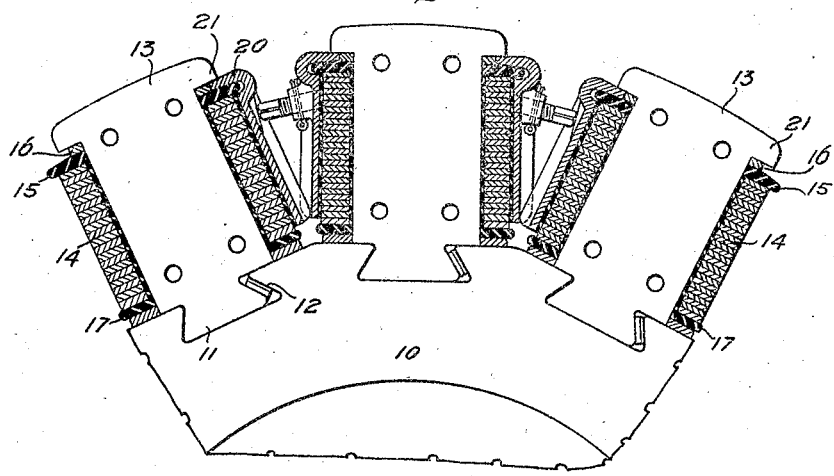
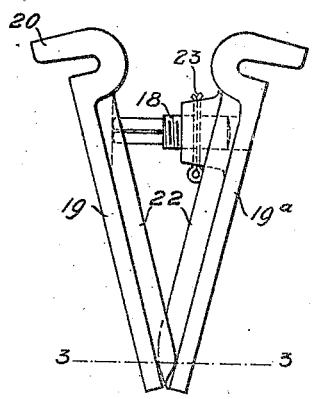
Witnesses
Rob. E. Foll.
Chas. L. Byron
Inventor
Arthur J. Brown
By Chas. L. Loss
Attorney.

UNITED STATES PATENT OFFICE.

ARTHUR J. BROWN, OF MILWAUKEE, WISCONSIN, ASSIGNOR TO ALLIS-CHALMERS COMPANY, A CORPORATION OF NEW JERSEY.

FIELD-MAGNET STRUCTURE.

992,846.

Specification of Letters Patent.  Patented May 23, 1911.

Application filed April 19, 1909.  Serial No. 490,967.

*To all whom it may concern:*

Be it known that I, ARTHUR J. BROWN, a citizen of the United States, residing at Milwaukee, in the county of Milwaukee and State of Wisconsin, have invented certain new and useful Improvements in Field-Magnet Structures, of which the following is a full, clear, and exact specification.

My invention relates to dynamo-electric machines, and particularly to alternating current machines of the type in which a rotating field is used. It is especially useful for high speed machines.

Usually in rotating field machines, the pole tips or shoes of the field poles are relied on to keep the field coils in place and to overcome centrifugal force acting on the coils. But because of a component of the centrifugal force normal to the axis of each field pole, the portions of the coils which are parallel to the shaft have a tendency to bulge out from the field poles, especially when the rotor is running at a high rate of speed.

The object of my invention is to provide a simple construction which will effectively and fully counteract all effects of centrifugal force on the field windings of projecting pole rotating field machines, and particularly will prevent such windings from bulging.

In carrying out my invention I provide bracing plates located between adjacent projecting poles of a rotating field structure and means interposed between the plates for bracing said plates against the coils on said poles to support such coils.

In the accompanying drawing, Figure 1 is a sectional view of a portion of the rotating field structure of a dynamo-electric machine embodying my invention; Fig. 2 is a side view of my bracing device; and Fig. 3 is a section on the line 3—3 of Fig. 2.

Mounted in any desired manner on the rim 10 of the rotating member of a dynamo-electric machine, as by means of dove-tails 11 and wedges 12, are projecting field poles 13 provided with the usual insulated field coils 14. Insulating collars 15 are preferably placed between the coils and the pole-tips 21 and spaced from the latter by rings 16. Insulating collars 17 may also be provided between the field coils and the rim 10.

A pair of bracing plates 19 and 19$^a$ is arranged between each pair of poles, and the two plates of each pair are forced apart and against the coils on said poles by a screw 18. Proper insulation is provided between these plates and the coils. The screw 18 engages a thread in one of the bracing plates, say 19$^a$, and has a rounded head which engages the other of said plates, the latter preferably having a hollowed-out portion to receive such head. The plates 19 and 19$^a$ are prevented from being thrown radially outward by properly engaging some part of the projecting field magnet; as shown, the plates have inturned end portions 20 which extend under the pole-tips 21. The bracing plates may also be provided with ribs 22, which strengthen the plates and serve as bearing points for the inner ends of the plates. These ribs are also arranged to overlap so as to prevent relative edgewise movement of the plates. After the poles and coils are in place, each pair of bracing plates 19 and 19$^a$ is inserted between two adjacent poles, the screw 18 being properly lowered into the plate 19$^a$. Then by rotating the screw 18 to raise it out of the plate 19$^a$, the two plates are forced apart against the coils and the inturned ends 20 are brought under the pole-tips 21. When the desired degree of bracing is obtained the screw is prevented from loosening by means of a cotter pin 23, the hole for which may be drilled after the parts are in place.

With the arrangement shown, the field coils 14 and the bracing plates 19 and 19$^a$ are prevented from moving radially outward by the engagement of the inturned end portions 20 with the pole-tips 21, while the coils are prevented from bulging by means of the plates 19 and 19$^a$ and screws 18.

Many modifications may be made in the arrangement here specifically shown and described, and I aim in my claims to cover all modifications which do not involve a departure from the spirit and scope of my invention.

What I claim as new is:—

1. In the rotating member of a dynamo-electric machine, the combination of projecting field poles, coils thereon, bracing plates between adjacent poles and having means to prevent a relative edgewise movement between said plates, said embracing plates having inturned ends, means interposed between said plates for forcing them apart against the coils on the adjacent poles and their inturned end portions under the pole tips of said poles, and a key extending through said means for holding said means in a fixed position.

2. In a dynamo-electric machine, the combination of field poles, coils thereon, bracing plates to prevent displacement of said coils, said bracing plates having ribs to prevent a relative edgewise movement between said plates, and means interposed between said plates for forcing them apart against the coils.

3. In a dynamo-electric machine, the combination of field poles, coils thereon, bracing plates coöperating with said coils to prevent their displacement, said plates having projecting portions coöperating with said poles to prevent displacement of the plates due to centrifugal action, and also having engaging portions to prevent a relative edgewise movement between said plates, and means for forcing the plates into engagement with said coils.

4. In the rotating member of a dynamo-electric machine, the combination of projecting field poles, coils thereon, two bracing plates having inturned ends, said plates having ribs on one side arranged to prevent a relative edgewise movement between said plates, and means interposed between said plates for forcing them apart against the coils on adjacent poles and their inturned ends under the pole tips of said poles.

5. In the rotating member of a dynamo-electric machine, the combination of projecting field poles, coils thereon, a pair of bracing plates between every two adjacent poles and having means to prevent a relative edgewise movement between said plates, said bracing plates having inturned ends, and means interposed between said plates for forcing them apart against the coils on the adjacent poles.

6. In a dynamo-electric machine, the combination of a rotatable field structure provided with projecting field poles, coils on said poles, bracing plates having inturned ends coöperating with the field structure to prevent displacement of said plates due to the action of centrifugal force, said plates also having engaging portions to prevent a relative edgewise movement between the plates, and means for forcing said plates into intimate contact with the sides of said coils to prevent displacement thereof.

7. In a dynamo-electric machine, the combination of field poles, coils thereon, bracing plates to prevent displacement of said coils, said plates having means to prevent a relative edgewise movement between said plates, and means for forcing said plates into intimate contact with said coils.

Milwaukee, Wis., Apr. 15, 1909.

In testimony whereof I affix my signature, in the presence of two witnesses.

ARTHUR J. BROWN.

Witnesses:
H. C. CASE,
CHAS. L. BYRON.

---

Correction in Letters Patent No. 992,846.

It is hereby certified that in Letters Patent No. 992,846, granted May 23, 1911, upon the application of Arthur J. Brown, of Milwaukee, Wisconsin, for an improvement in "Field-Magnet Structures," an error appears in the printed specification requiring correction as follows: Page 1, line 107, the word "embracing" should read *bracing;* and that the said Letters Patent should be read with this correction therein that the same may conform to the record of the case in the Patent Office.

Signed and sealed this 27th day of June, A. D., 1911.

[SEAL.]

C. C. BILLINGS,
*Acting Commissioner of Patents.*